US006985405B2

(12) United States Patent
Ren et al.

(10) Patent No.: US 6,985,405 B2
(45) Date of Patent: Jan. 10, 2006

(54) METHOD FOR STABLE ESTIMATION OF ANISOTROPIC PARAMETERS FOR P-WAVE PRESTACK IMAGING

(75) Inventors: Jiaxiang Ren, Katy, TX (US); Ruben D. Martinez, Sugar Land, TX (US)

(73) Assignee: PGS Americas, Inc., Houston, TX (US)

( * ) Notice: Subject to any disclaimer, the term of this patent is extended or adjusted under 35 U.S.C. 154(b) by 180 days.

(21) Appl. No.: 10/692,198

(22) Filed: Oct. 23, 2003

(65) Prior Publication Data

US 2005/0088914 A1  Apr. 28, 2005

(51) Int. Cl.
*G01V 1/36* (2006.01)

(52) U.S. Cl. .............................. 367/52; 367/50; 702/14

(58) Field of Classification Search .................. 367/50, 367/51, 52; 702/14
See application file for complete search history.

(56) References Cited

U.S. PATENT DOCUMENTS

| 6,067,275 | A | * | 5/2000 | Sayers | 367/50 |
| 6,094,400 | A | * | 7/2000 | Ikelle | 367/75 |
| 6,864,890 | B2 | * | 3/2005 | Meek et al. | 345/440 |

FOREIGN PATENT DOCUMENTS

GB   2 312 281   10/1997

OTHER PUBLICATIONS

Tariq Alkhalifah, "Velocity analysis using nonhyperbolic moveout in transversely isotropic media", Geophysics, 1997, pp. 1839-1845, vol. 62, No. 6.
Jon F. Claerbout, Sergey Fomel, "Geophysical Estimation by Examples: Environmental sound image enhancement", Stanford University, 2001.
Robert G. Clapp, Paul Sava, Jon F. Claerbout, "Interval velocity estimation with a null-space", Stanford Exploration Project, 1998, pp. 147-157, Report SEP-97.
Min Lou, Long Don Pham, Sheng Lee, "Anisotropic parameter estimation from P- and PS-converted wave data", EAGE 64$^{th}$ Conference & Exhibition, 2002, Florence, Italy.
Ruben D. Martinez, Sheng Lee, "A strategy for anisotrpic P-wave prestack imaging", 72$^{nd}$ Ann. Internat. Mtg, Soc. Expl. Geophys., Expanded Abstracts, 2002, pp. 149-152.

* cited by examiner

*Primary Examiner*—Ian J. Lobo
(74) *Attorney, Agent, or Firm*—E. Eugene Thigpen; Richard A. Fagin

(57) ABSTRACT

A method is disclosed for determining interval anisotropic parameters. The method includes determining normal moveout (NMO) velocities and effective anelliptical parameters from seismic data traces. The NMO velocities are processed to obtain interval NMO velocities. The NMO velocities, effective anelliptical parameters and interval NMO velocities are inverted to obtain the interval anisotropic parameters. In one embodiment, the inversion includes damped least squares. In one embodiment, the inversion is preconditioned.

10 Claims, 9 Drawing Sheets

METHOD FOR STABLE ESTIMATION OF ANISOTROPIC PARAMETERS FOR P-WAVE PRESTACK IMAGING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of seismic data processing methods. More specifically, the invention relates for methods for estimating seismic compressional wave anisotropy for use in pre-stack migration imaging.

2. Background Art

Seismic surveying is used to evaluate structures of, compositions of, and fluid content of subsurface earth formations. A particular application for seismic surveying is to infer the presence of useful materials, such as petroleum, in the subsurface earth formations. Generally, seismic surveying includes deploying an array of seismic sensors at or near the earth's surface, and deploying a seismic energy source near the sensors also at or near the surface. The seismic energy source is actuated and seismic energy emanates from the source, traveling generally downwardly through the subsurface until it reaches one or more acoustic impedance boundaries. Seismic energy is reflected from the one or more impedance boundaries, where it then travels upwardly until being detected by one or more of the sensors. Structure and composition of the subsurface is inferred from the travel time of the seismic energy, and the amplitude and phase of the various frequency components of the seismic energy with respect to the energy emanating from the seismic source.

In order to infer the structures of subsurface earth formations from seismic travel times measured at the earth's surface from a source position at the surface, it is necessary to determine the velocity of the various formations through which the seismic energy passes. Velocities of the earth formations can vary both with respect to depth in the earth (vertically), and with respect to geographic position (laterally). Seismic data, however, are recorded only with respect to time. Methods known in the art for estimating velocities of the earth formations .both vertically and laterally rely on inferences about the travel path geometry of the seismic energy as it travels from the seismic source to the various seismic receivers deployed at the earth's surface.

Migration is a process performed on seismic data in which depth estimates to one or more reflective horizons (acoustic impedance boundaries) in the earth are made from the "two way" travel time of seismic energy from the source, to the reflective horizons, and back to the seismic receivers. The depth estimates are computed and displayed with respect to geographic position of the reflective horizons. Depth estimates based on two way travel time must be corrected for the effects of seismic energy travel path differences between various seismic energy source and receiver geographic positions that are used during data acquisition. In order to correct the depth estimates for source and receiver positions, it is necessary to accurately estimate the velocity of seismic energy in the earth from the earth's surface to (or the ocean bottom in marine seismic data) to each subsurface reflective horizon. Methods are known in the art for estimating velocity from two way travel time from the seismic source to the reflective horizons and back to the seismic receivers.

It is known in the art that some earth formations are anisotropic with respect to seismic velocity. Anisotropy can be observed as different velocity in a single medium depending on the direction of propagation of the seismic energy through the medium. In anisotropic earth formations, the depth estimating (imaging) process needs to take the anisotropy into account in order to accurately position the seismic reflective horizons with respect to depth and geographic position. Reliable estimation of anisotropy parameters is thus important to accurate depth imaging. Because the anisotropy parameters and velocity are related, however, estimation of anisotropy parameters is not trivial and is often unstable using methods known in the art.

It is known in the art to estimate certain anisotropy parameters (called "anelliptic" parameters) from prestack seismic data. "Prestack" seismic data are seismic data traces (traces being a term used in the art for a record of the signal detected by one of the seismic receivers) that have not been summed, average, or otherwise processed together with any other seismic data trace. See for example, Alkhalifah, T., *Velocity analysis using nonhyperbolic moveout in transversely isotropic media*, Geophysics 62, 1839–1845 (1997). See also Lou, M., Pham, L. D. and Lee, S., *Anisotropic parameter estimation from joint P- and C-wave data, $64^{th}$ Ann. Mtg.*, Eur. Assn. Geosci. Eng., Florence (2002). See also, Martinez, R. D. and Lee, S., 2002, *A strategy for anisotropic P-wave prestack imaging, $72^{nd}$ Ann. Internat. Mtg.*, Soc. Expl. Geophys., Expanded Abstracts, 149–152 (2002).

A method disclosed in the Martinez and Lee reference, for example, combines prestack time migrations and prestack depth migrations for estimating the anisotropic parameters and velocities. The method disclosed in the Martinez and Lee reference has been shown to generate an accurate result for the effective anelliptical ($\eta_{\it eff}$) parameter. FIG. 1 shows a flow chart of the method disclosed in the Martinez and Lee reference. At 10, seismic data can be prestack time migrated. At 11, the prestack time migrated data may be scanned to obtain a model of NMO velocity and effective anelliptical parameters. The effective parameter model may be processed, at 12, to obtain interval velocity and anelliptical parameter models. Sonic logs, check shot surveys, and/or vertical seismic profile (VSP) data, at 13, may be used to derive the vertical velocity model. Alternatively, at 16, the interval parameter model may be put through an anisotropic ray tracing procedure, and at 15, the data are prestack depth migrated. The interval velocity and anelliptical parameter model may be adjusted in depth, at 14, and the ray tracing and depth migration are repeated until a satisfactory result is obtained.

The effective parameters $\eta_{\it eff}$ and $V_{nmo}$ with respect to two-way seismic travel time, obtained from the prestack time migration, need to be converted into "interval" parameters $\eta_{int}$ and $V_{int}$ with respect to depth, as explained in the Martinez and Lee reference. $\eta_{int}$ is described in the Martinez and Lee reference as being inverted from the effective anelliptical parameter ($\eta_{\it eff}$). The effective anelliptical parameter is equivalent to an average anelliptical parameter from the earth's surface or water bottom to a selected depth in the subsurface) and effective velocity ($V_{nmo}$). Both the effective velocity and effective anelliptical parameter are typically determined by "scanning" compressional (P-wave)

moveout on common-image gathers from prestack time migration. Scanning refers to the process of calculating a correlation or semblance between selected seismic traces after adjusting using various values of compressional velocity and effective anelliptical parameter. Because the selected traces typically represent different source to receiver distances (offsets), the semblance between traces will be related to the moveout velocity and anelliptical parameter of the earth formations between the seismic source and the one of the seismic receivers used to record each trace. The values of compressional velocity and anelliptical parameter which provide the greatest value of semblance are selected as the effective (or normal moveout) velocity and anelliptical parameters. The values of effective anelliptical parameter and normal moveout velocity are then used to obtain values of interval velocity and interval anelliptical parameter. The inversion to obtain each set of interval values is performed using the well known Dix equation. The parameters determined using the Dix equation are then used to generate a prestack depth migrated image. The image is checked for error, and the values of interval parameters are adjusted, and the prestack depth migrated image is generated again, as explained above with respect to FIG. 1. The foregoing procedure is repeated until the image error is determined to be at a minimum, or below a selected threshold. Image error is determined by lack of "flatness" (consistency in two way time to a particular reflective horizon) in common image gathers (CIGs).

Because of its differential nature, however, the Dix equation boosts errors present in the inputs (the effective velocities and effective anelliptical parameters), making its output unstable. This is especially true in the inversion for the anelliptical parameter $\eta_{int}$ because the velocity is related to the anelliptical parameter by the $4^{th}$ power of the velocity. Thus, relatively small errors in the velocity can be translated into much larger errors in the output interval anelliptical parameters $\eta_{int}$. There thus exists a need for a better technique to determine interval anelliptical parameters from seismic data.

SUMMARY OF INVENTION

One aspect of the invention is a method for determining interval anelliptical parameters. The method includes determining normal moveout velocities and effective anelliptical parameters from seismic data traces. The normal moveout velocities are processed to obtain interval velocities. The normal moveout velocities, effective anelliptical parameters and interval velocities are inverted to obtain the interval anelliptical parameters. In one embodiment, the inversion is performed using preconditioned damped least squares. In one embodiment, the normal moveout velocities and effective anelliptical parameters are determined by scanning a time migrated trace gather that accounts for ray bending.

Another aspect of the invention is a computer program stored in a computer readable medium. A program according to this aspect of the invention includes logic operable to cause a programmable computer to perform the following process. First, normal moveout velocities and effective anelliptical parameters are determined from seismic data traces. The normal moveout velocities are processed to obtain interval velocities. The normal moveout velocities, effective anelliptical parameters and interval velocities are then inverted to obtain the interval anelliptical parameters. In one embodiment, the inversion is performed using preconditioned damped least squares. In one embodiment, the normal moveout velocities and effective anelliptical parameters are determined by scanning a time migrated trace gather that accounts for ray bending.

Other aspects and advantages of the invention will be apparent from the following description and the appended claims.

DETAILED DESCRIPTION

Figure 1:
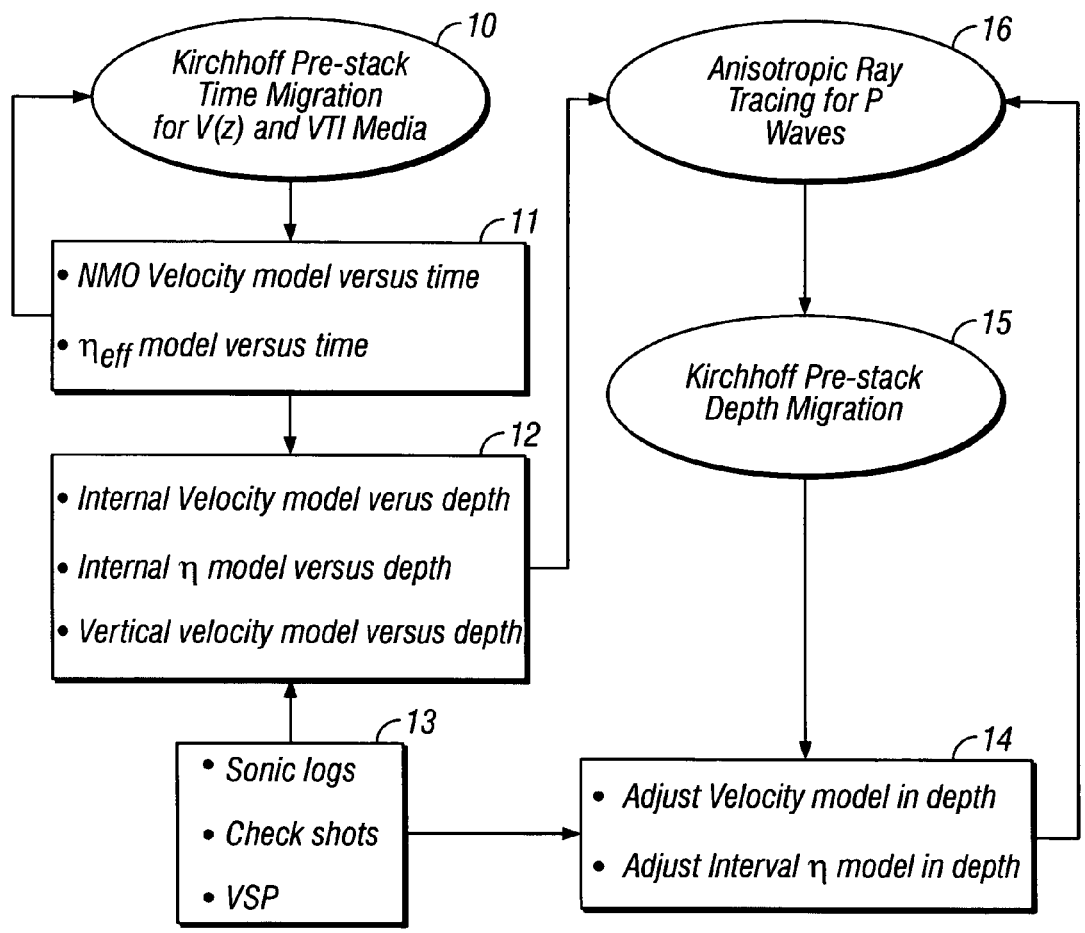
FIG. 1 shows a flow chart of prior art processing to obtain anelliptical parameters.

Methods according to the invention are applicable to transverse isotropy with vertical axis of symmetry (VTI) layered earth formations. The formations also have vertical velocity which changes with depth beneath the earth's surface. A method according to one embodiment of the invention includes using a preconditioned damped least squares (DLS) inversion process to determine interval velocities, $V_{int}$, and interval anelliptical parameters $\eta_{int}$ from the effective values of the anelliptical parameter and from effective normal moveout velocities. DLS inversion has been successfully used, for example, to invert interval velocity from RMS velocity. See, for example, Claerbout, J. F. and Fomel, S., 2001, *Geophysical Estimation by Examples: Environmental soundings image enhancement*, Stanford University (2001). See also Clapp, R. G., Sava, P. and Claerbout, J. F., *Interval velocity estimation with a null-space*, SEP 97, 147–156 (1998).

In a method according to the invention the $V_{int}$ and $\eta_{int}$ inversions can be formulated as a system of linear equations. Therefore, convergence to a solution set of interval velocities and anelliptical parameters (a "solution model") can be performed by means of conjugate gradients. In one embodiment, preconditioning is used to speed up convergence to the solution model. In the description which follows, the mathematical basis for determining interval anelliptical parameters and interval velocities will first be provided, and then a description of one implementation of a method according to the invention will be provided.

1. The relationship between effective and interval values of the anelliptical parameter η

Referring, for example, to Alkhalifah, T., *Velocity analysis using nonhyperbolic moveout in transversely isotropic media*, Geophysics 62, 1839–1845 (1997), the effective anelliptical parameter, $\eta_{\it eff}$, can be defined by the expression:

$$\eta_{\it eff}(t_0) = \frac{1}{8}\left\{\frac{1}{t_0 V_{nmo}^4}\int_0^{t_0} V_{int}^4(\tau)[1+8\eta_{int}(\tau)]\,d\tau - 1\right\} \quad (1)$$

The above expression is related to the normal moveout equation for compressional (P) waves in layered VTI media, in which $t_0$ represents the two way travel time at zero offset (a condition where the seismic source and receiver are collocated at the earth's surface or water surface), and $V_{int}$ represents the interval velocity.

The normal moveout velocity ($V_{nmo}$) can be determined by the expression:

$$V_{nmo}^2(t_0) = \frac{1}{t_0}\int_0^{t_0} V_{int}^2(\tau)\,d\tau \quad (2)$$

The effective anelliptical parameter, $\eta_{\it eff}$, can be split into two components:

$$\eta_{\it eff} = \eta_v + \eta_a \quad (3)$$

In equation (3), the component $\eta_v$ can be determined by the expression:

$$\eta_v = \frac{1}{8}\left\{\frac{1}{t_0 V_{nmo}^4}\int_0^{t_0} V_{int}^4(\tau)\,d\tau - 1\right\} \quad (4)$$

and the component $\eta_a$ can be determined by the expression:

$$\eta_a = \frac{1}{t_0 V_{nmo}^4}\int_0^{t_0} V_{int}^4(\tau)\eta_{int}(\tau)\,d\tau \quad (5)$$

The $\eta_v$ component of $\eta_{\it eff}$ is due to ray bending. Ray bending results from vertical seismic velocity variation with depth. The $\eta_a$ a component represents the intrinsic anisotropy of the earth formations. $\eta_{\it eff}$ can be determined by scanning gathers generated in prestack time migration that account for the ray bending. Therefore, $\eta_{\it eff}$ determined by scanning such gathers is essentially equal to $\eta_a$, the intrinsic anelliptical parameter. This means that an inversion for $\eta_{int}$ can be performed based on equation (5) using the $\eta_{\it eff}$ parameters determined by scanning a prestack time migrated gather that accounts for ray bending.

Preconditioned DLS Inversion Process to Obtain Values of $\eta_{int}$

Figure 2:
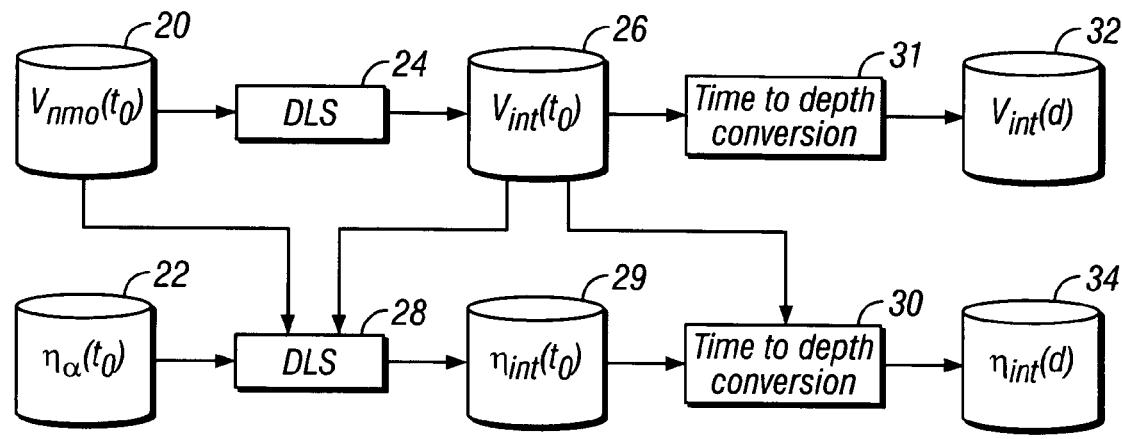
FIG. 2 shows a flow chart of one embodiment of a process according to the invention.

FIG. 2 shows a flow chart for an embodiment of DLS inversion to obtain $\eta_{int}$ from the interval velocities, normal moveout velocities and intrinsic anelliptical parameter. First, at 20, seismic data are scanned to obtain values of $V_{nmo}$, and are scanned at 22 to obtain $\eta_{\it eff}$. Scanning, as previously explained, includes calculating semblance between selected seismic traces with respect to values of time, normal moveout velocity and effective anelliptical parameter. Values of effective anelliptical parameter and normal moveout velocity which result in the highest semblance values between selected traces are selected as the values of effective anelliptical parameter and normal moveout velocity at each selected time.

Next, at 24, the $V_{nmo}$ values are inverted using DLS to obtain a stable set of values of $V_{int}$, at 26. The stable set of values for $V_{int}$ 26 is important to obtain stable estimates of $\eta_{int}$, because, as can be inferred from equations (1) and (5) above, the velocity is related to the anelliptical parameter by the 4$^{th}$-power of the velocity. Thus, a small error in $V_{int}$ may be translated into large errors in the output $\eta_{int}$. The inverted $V_{int}$ 26 can also be used in a time to depth conversion, at 31, as part of a velocity model for depth imaging, as shown in FIG. 2 at 32. The intrinsic anelliptical parameter $\eta_a$ is determined, as explained above, from the effective anelliptical parameter, by using a time migration analysis that accounts for ray bending, in which case the effective anelliptical parameter is equal to the intrinsic anelliptical parameter.

At 28, the interval anelliptical parameter is DLS-inverted from $\eta_a$, $V_{nmo}$, and $V_{int}$ to generate a set of values of $\eta_{int}$ at 29. A time-to-depth conversion can be applied, at 30 to the resultant hint values, using $V_{int}$, in order to obtain its value versus depth, which can then be used for depth imaging, as shown at 34. $\eta_a$, as explained above, is equal to the effective anelliptical parameter when the effective anelliptical parameter is scanned from time migrated image gathers that account for ray bending. $V_{int}$ can also be used to generate a depth migrated velocity image, as shown at 32.

Having explained a method according to the invention in general terms, an embodiment of DLS will be explained. The objective function of the DLS inversion for either $V_{int}$ or $\eta_{int}$ can be expressed as:

$$\|Cm-d\|+\epsilon\|Dm\|=\min \quad (6)$$

In equation (6), d is the data vector, whose $i^{th}$ component is $(V_{nmo})_i^2(t_0)_i$ and $(V_{nmo})_i^4(\eta_a)_i(t_0)_i$ for the $V_{int}$ and $\eta_{int}$ inversions, respectively. m is the model vector, whose $i^{th}$ component is $(V_{int})_i^2$ (square of the $i^{th}$ interval velocity) and $(V_{int})_i^4(\eta_{int})_i$ (product of the fourth power of the ith interval velocity and the $i^{th}$ interval anelliptical parameter) for the $V_{int}$ and $\eta_{int}$ inversions, respectively. $\epsilon$ is the damping factor. C is the causal time-integration matrix, the non-zero component of which in its $i^{th}$ column is equal to $(t_0)_{i+1}-(t_0)_i$. D is the differentiation matrix and is equal to the inverse of the causal time-integration matrix: $D=C^{-1}$.

The first part on the left-hand side of equation (6) is the data fitting objective, which is a user selected error threshold between the modeled and the actual velocity and anelliptical parameter fields. The second part is the model damping objective, which is selected to minimize the variability of the inverted model. The system of linear equations represented by equation (6) can be solved by the conjugate gradient method, which is known in the art.

To speed up the solution convergence, in some embodiments a preconditioning step can be performed. See the Claerbout and Fomel reference cited above for an example of preconditioning. Preconditioning can be performed by changing variables in equation (6) as shown:

$$p=Dm \quad (7)$$

where p is a preconditioning vector. Thus, from equation (6). a final system of linear equations to be solved can be expressed as:

$$\|C^2p-d\|+\epsilon\|p\|=\min \quad (8)$$

A method according to the invention generates a stable result for the interval anelliptical parameter and the interval velocity. The method according to the invention systematically takes the data fitting and model smoothing into account in the sense of least squares. While it would be possible to filter or smooth unstable anelliptical and interval velocity parameters obtained using the Dix equation, the results so obtained have been shown not to fit actual seismic data very well, as compared with the parameters obtained using the method according to the invention. The method of the invention is robust and effective, as has been shown by examples in this description and in actual use.

Figure 3:
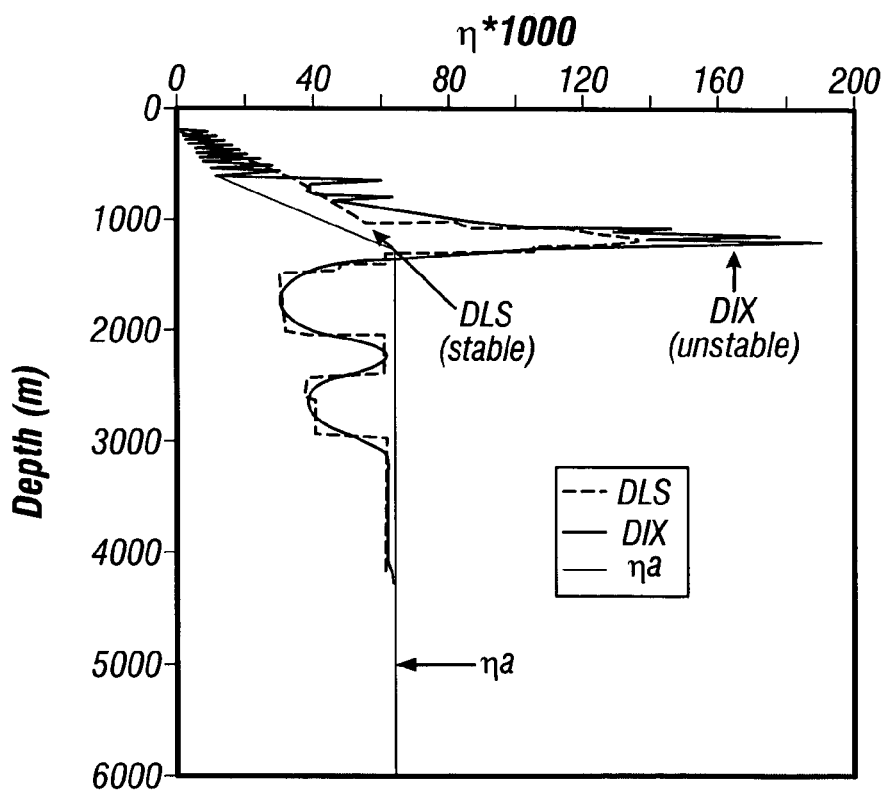
FIG. 3 shows a comparison of anelliptical-parameters obtained using a method according to the invention with parameters obtained using the Dix equation.

To illustrate the performance of the method of the invention, presented here is a field data example. FIG. 3 shows the inverted ) $\eta_{int}$, as shown by curve 40, from the input values of $\eta_a$, as shown by curve 42 at one image location. For comparison, FIG. 3 also shows the corresponding result obtained by the Dix equation, as shown by curve 44. It is apparent from the graph in FIG. 3 that the DLS approach gives a much more stable result.

Figure 4A:
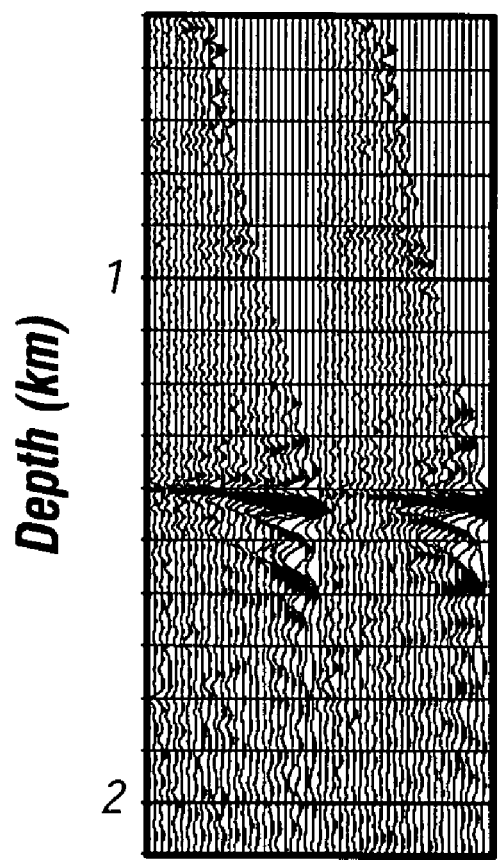
FIGS. 4a and 4b show, respectively, image gathers made using a method according to the invention and by the Dix equation.
Figure 4B:
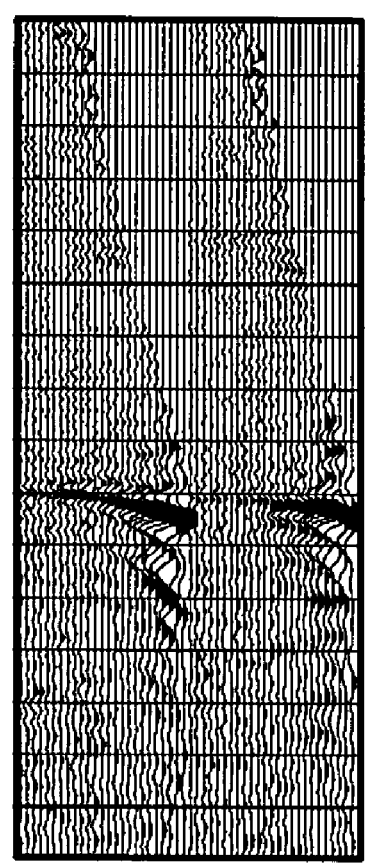

FIGS. 4a and 4b show two migrated common-image gathers (CIGs) from depth imaging, which were generated using the $V_{int}$ and $\eta_{int}$ parameters obtained using the method of the invention (FIG. 4a) and using the Dix equation (FIG. 4b). For ray tracing, it proved necessary to apply smoothing to the parameters obtained with the Dix equation. However, it was not necessary to apply smoothing to the parameters obtained with the method of the invention By using the velocity model obtained with the method of the invention, depth migration produced a better image.

Figure 5A:
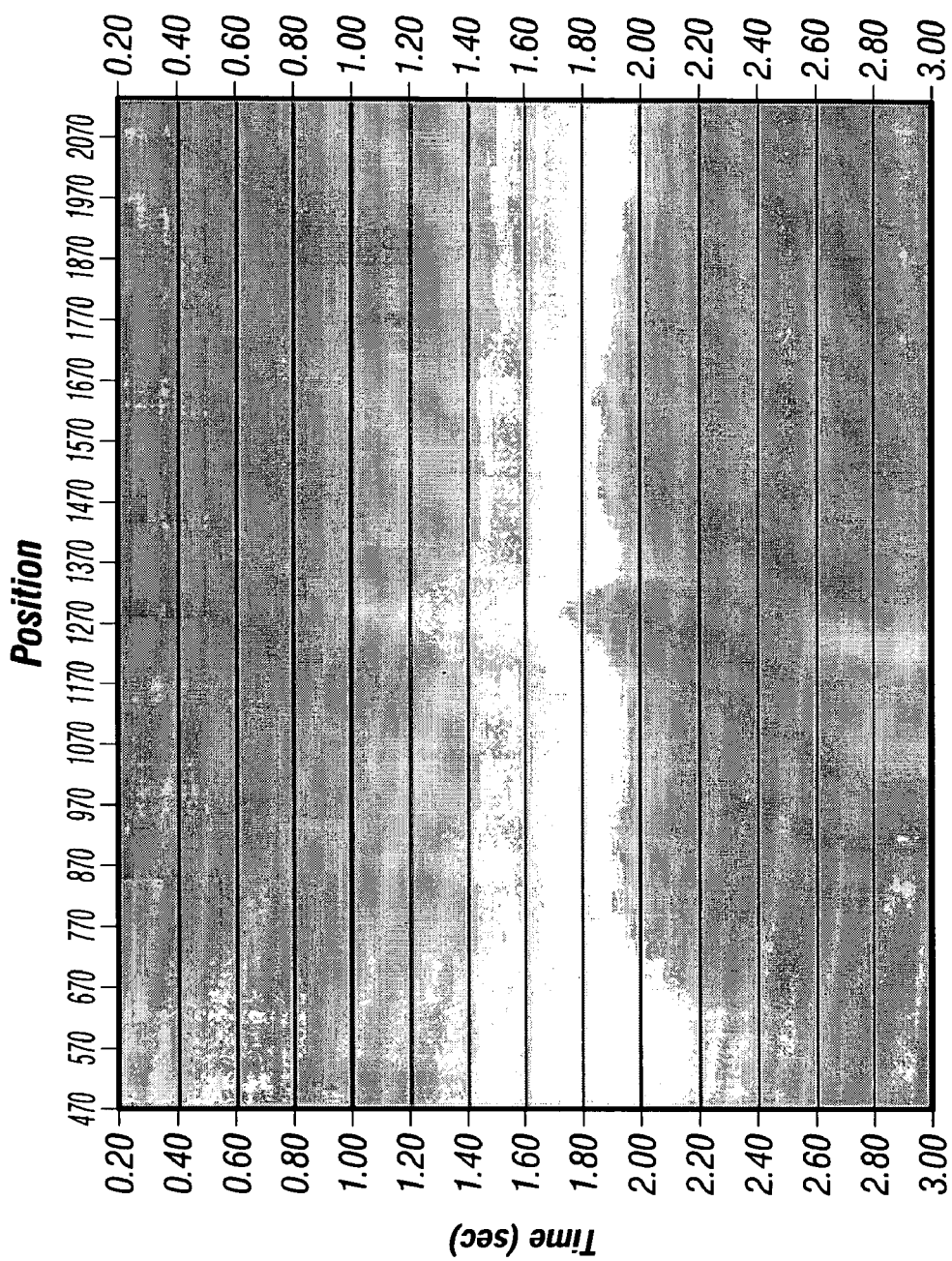
FIGS. 5a and 5b show, respectively, input values of NMO velocity and calculated values of interval velocity obtained using a method according to the invention on a seismic data survey line.
Figure 5B:
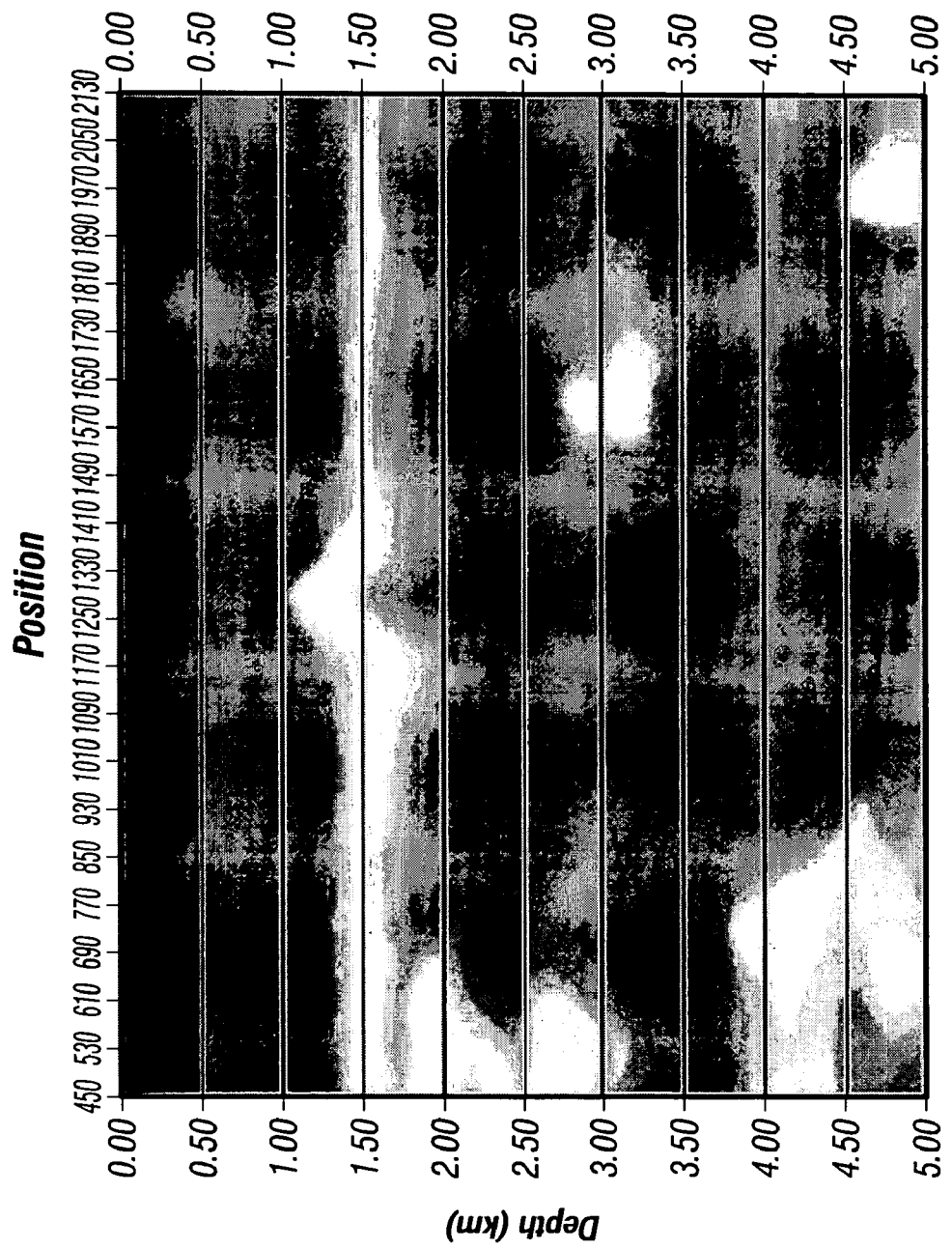
Figure 6A:
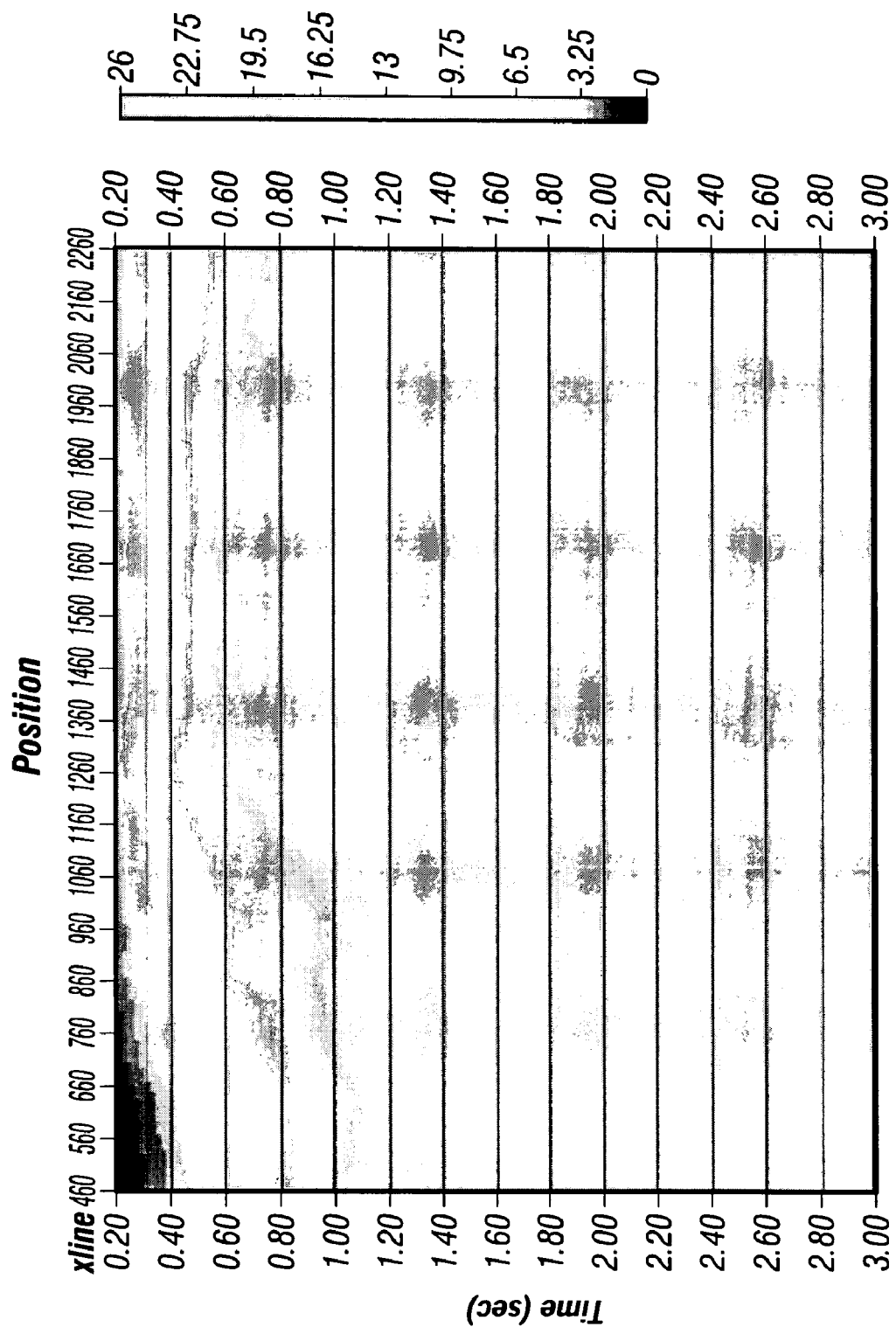
FIGS. 6a and 6b show, respectively, input effective anelliptical parameters and calculated interval anelliptical parameters obtained for the same survey line as shown in FIG. 5.
Figure 6B:
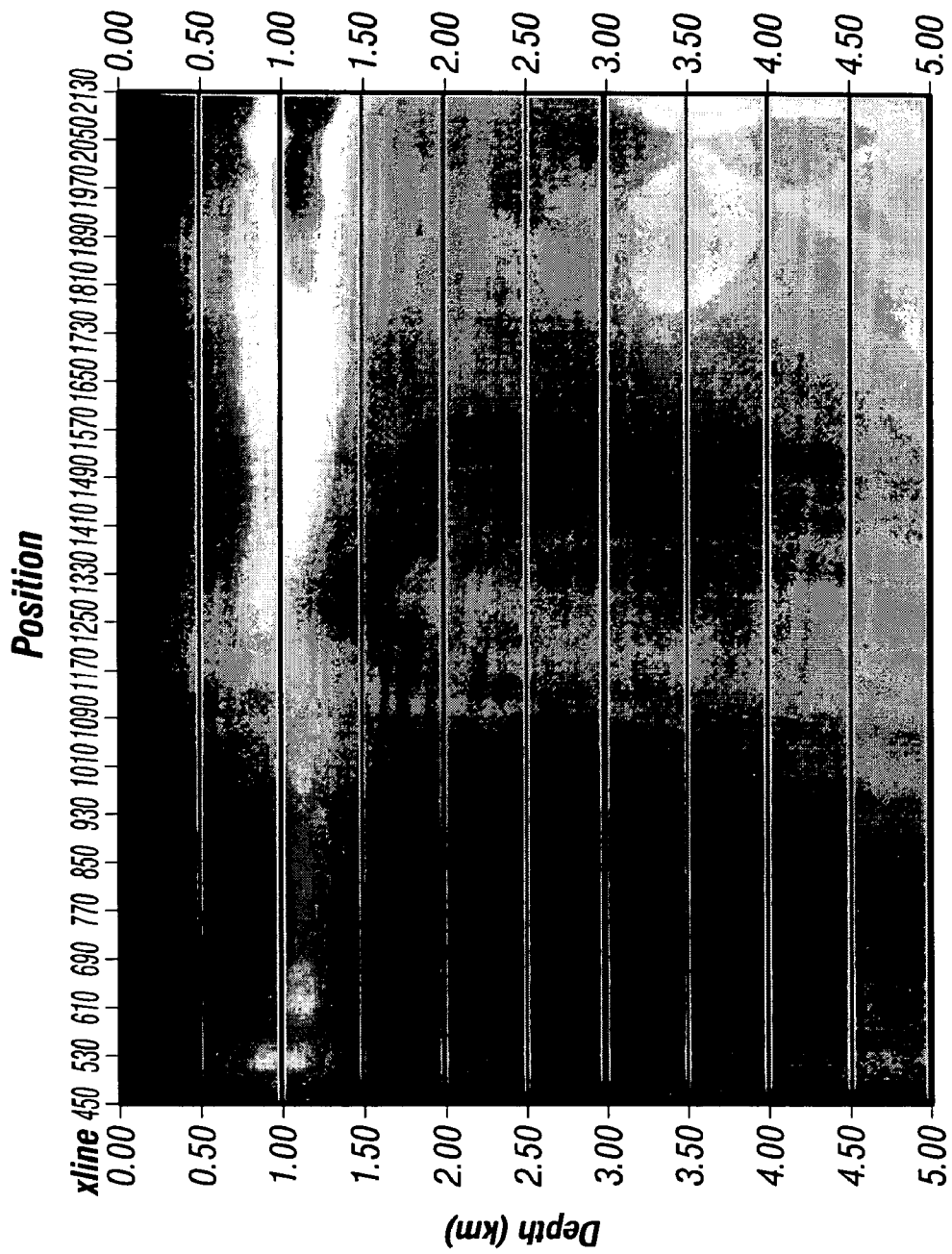

FIG. 5 a shows a three dimensional graph of NMO velocity with respect to time in a selected number of seismic data traces in a survey "line." Time is on the vertical axis, trace position is shown in the horizontal axis, and NMO velocity is shown by the gray scale. The inverted interval velocities obtained using the method according to the invention for a selected seismic data survey "line" are shown graphically in FIG. 5b, wherein interval velocity is shown by the gray scale. The corresponding effective and interval anelliptical parameter values are shown graphically in FIGS. 6a and 6b, respectively. Anellpitical parameter values are shown by the gray scales in FIGS. 6a and 6b. Although smoothing was not applied to the parameter fields shown in FIGS. 5b and 6b, the parameter are shown to be substantially stable and smooth in both the vertical and lateral directions.

Figures 7A, 7B:
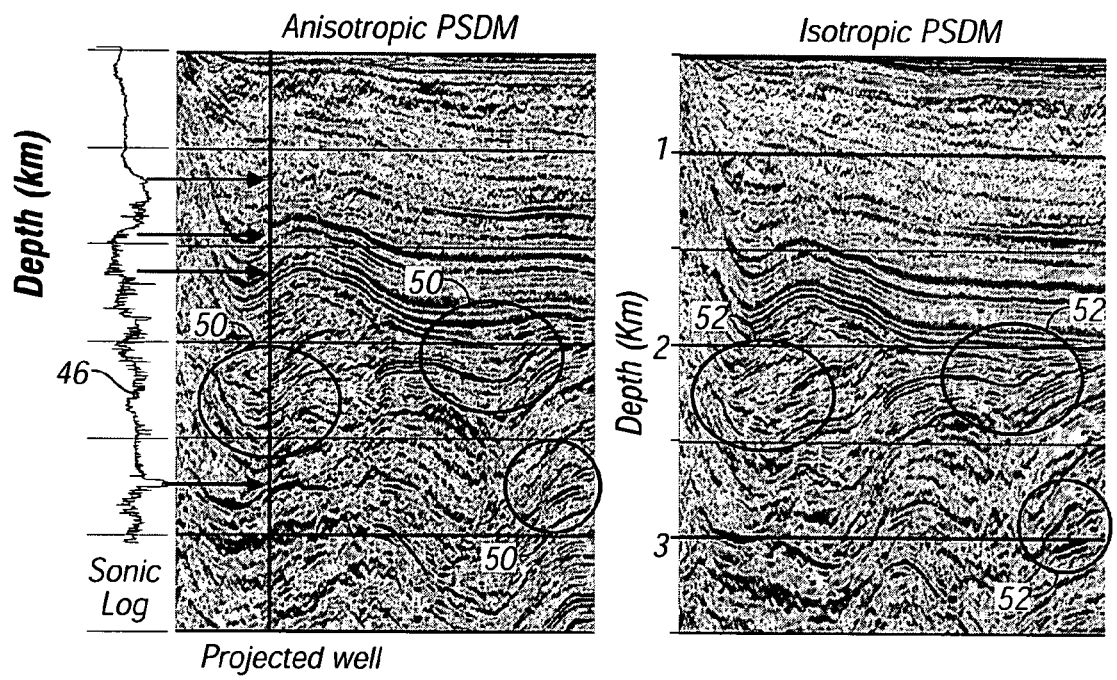
FIG. 7a shows part of a final image made from anisotropic prestack depth migration using the interval velocity and interval anelliptical parameters obtained using a method according to the invention.
FIG. 7b shows the corresponding image made from isotropic prestack depth-migration using the interval velocity obtained using the Dix equation.

FIG. 7a shows a part of a final image, which was generated from anisotropic prestack depth migration using $V_{int}$ and $\eta_{int}$ obtained using the method of the invention. FIG. 7b shows the same part of the image, which was generated from isotropic prestack depth migration using $V_{int}$ obtained using the Dix equation. Compared with the image in FIG. 7b, the image in FIG. 7a is a much better focused as illustrated in the encirciled areas indicated by reference numeral 50 in FIG. 7a and reference numeral 52 in FIG. 7b. The image in FIG. 7a also appears to correspond better to geologic information provided by a projected wellbore, shown at curve 46 and line position 48 in FIG. 7. It is shown that the method of the invention can provide reliable parameters for anisotropic migrations.

Figure 8:
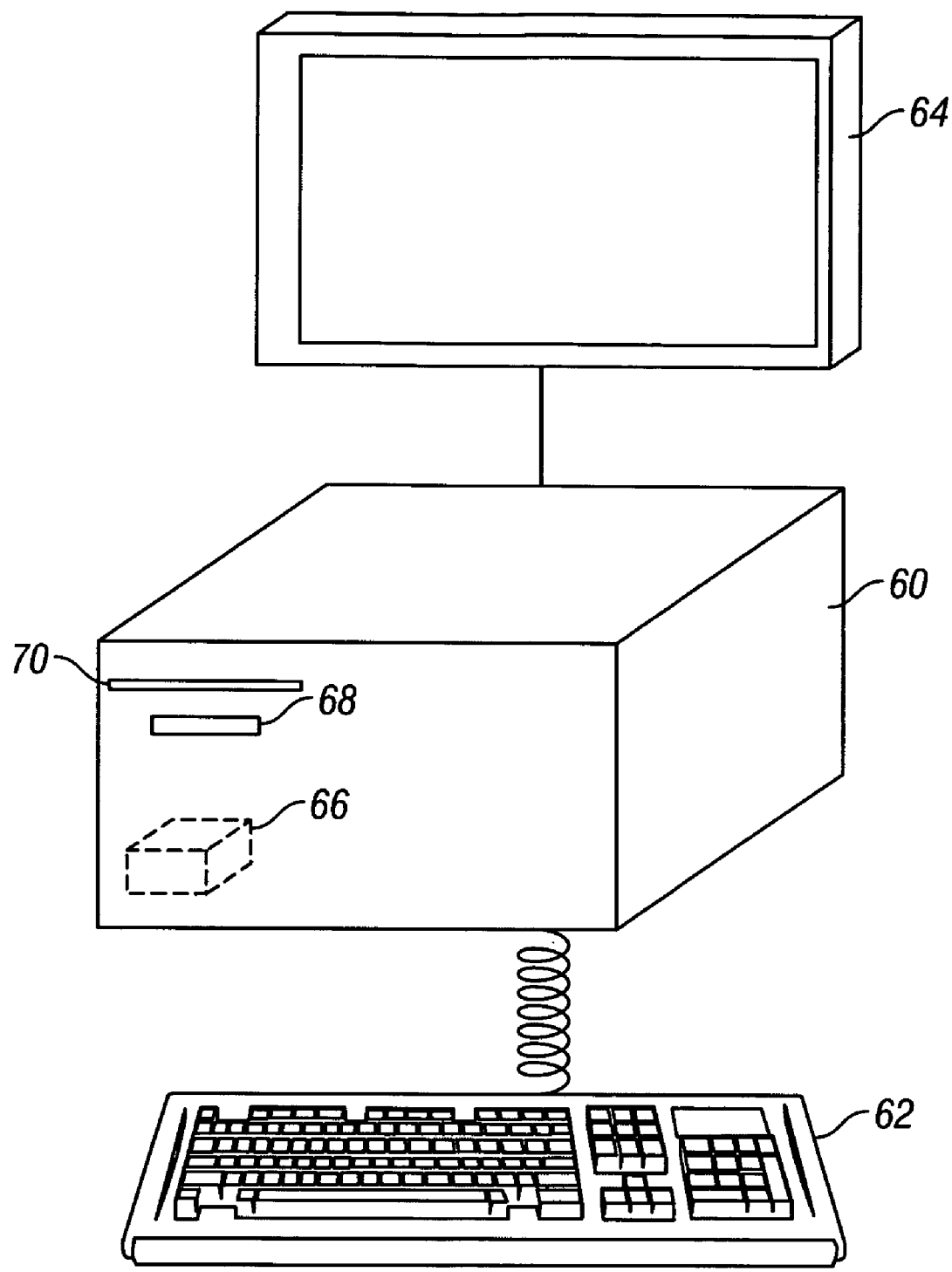
FIG. 8 shows a programmable computer used to read a program stored in a computer readable medium.

In another aspect, the invention relates to computer programs stored in a computer readable medium. Referring to FIG. 8, the foregoing process as explained with respect to FIG. 2, can be embodied in computer-readable code stored on a computer readable medium, such as floppy disk 68, CD-ROM 70 or magnetic hard drive 66 forming part of a general purpose programmable computer. The computer, as known in the art, includes a central processing unit 60, a user input device such as a keyboard 62 and a user display 64 such as a flat panel LCD display or cathode ray tube display. According to this aspect of the invention, the computer readable medium includes logic operable to cause the computer to execute steps as set forth above and explained with respect to FIG. 2.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining interval anisotropic parameters, comprising:
   determining normal moveout velocities and effective anelliptical parameters from seismic data traces; and
   inverting the normal moveout velocities and the effective anisotropic parameters to obtain the interval anelliptical parameters, the inverting comprising damped least squares inversion.

2. The method of claim 1 further comprising preconditioning the inverting.

3. The method of claim 1 wherein the inverting comprises solving a system of linear equations by conjugate gradients.

4. The method of claim 1 wherein the determining normal moveout velocities and effective anelliptical parameters are performed by scanning a time migrated trace gather, the time migrated trace gather accounting for ray bending.

5. The method of claim 1 further comprising generating a prestack depth migrated image using the interval normal moveout velocities and interval anelliptical parameters.

6. A computer program stored in a computer readable medium, the program including logic operable to cause a programmable computer to perform steps, comprising:
   determining normal moveout velocities and effective anelliptical parameters from seismic data traces;
   inverting the normal moveout velocities and the effective anisotropic parameters to obtain interval anelliptical parameters, the inverting comprising damped least squares inversion.

7. The computer program of claim 6 further comprising preconditioning the inverting.

8. The computer program of claim 6 wherein the inverting comprises solving a system of linear equations by conjugate gradients.

9. The computer program of claim 6 wherein the determining normal moveout velocities and effective anelliptical parameters are performed by scanning a time migrated trace gather of the seismic data traces, the time migrated gather accounting for ray bending.

10. The computer program of claim 6 further comprising generating a prestack depth migrated image using the interval normal moveout velocities and interval anelliptical parameters.

* * * * *